(12) United States Patent
Greiner et al.

(10) Patent No.: US 7,887,401 B2
(45) Date of Patent: Feb. 15, 2011

(54) VENTILATION VALVE FOR HEATERS, COMPRISING A HOLDING BODY AND AN AXIALLY DISPLACEABLE VALVE BODY

(75) Inventors: Manfred Greiner, Simonswald (DE); Mario Bartholoma, Winden (DE); Daniel Bartholoma, Biederbach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 289 days.

(21) Appl. No.: 10/549,065

(22) PCT Filed: Dec. 20, 2003

(86) PCT No.: PCT/EP03/14681

§ 371 (c)(1),
(2), (4) Date: Sep. 13, 2005

(87) PCT Pub. No.: WO2004/081457

PCT Pub. Date: Sep. 23, 2004

(65) Prior Publication Data

US 2006/0172678 A1 Aug. 3, 2006

(30) Foreign Application Priority Data

Mar. 13, 2003 (DE) ................. 203 03 986

(51) Int. Cl.
*F24F 13/06* (2006.01)
(52) U.S. Cl. .................. 454/284; 454/184
(58) Field of Classification Search .......... 454/322, 454/323, 324, 334, 284, 33 A
See application file for complete search history.

(56) References Cited

U.S. PATENT DOCUMENTS

| | | | | |
|---|---|---|---|---|
| 2,462,989 A | * | 3/1949 | Mufich et al. | 454/286 |
| 3,113,502 A | * | 12/1963 | Allen et al. | 454/154 |
| 3,976,574 A | * | 8/1976 | White | 210/188 |
| 4,280,647 A | * | 7/1981 | Nilsson | 227/147 |
| 4,320,696 A | * | 3/1982 | Daniels et al. | 454/323 |
| 5,697,351 A | * | 12/1997 | Schumacher | 123/574 |
| 6,298,873 B1 | * | 10/2001 | LeVey et al. | 137/493 |

FOREIGN PATENT DOCUMENTS

DE     6 751 165     1/1969

(Continued)

*Primary Examiner*—Steven B McAllister
*Assistant Examiner*—Samantha A Miller
(74) *Attorney, Agent, or Firm*—Volpe and Koenig, PC

(57) ABSTRACT

A ventilation valve (2) for heaters (1) or heating installations is provided, with the valve including a holding body (4) and a valve body (5) which can be axially displaced in the holding body (4) and closes a ventilation channel in the initial position and opens the channel after being axially displaced, the course of the ventilation channel (6) deviates from an axial direction and the ventilation channel includes an inlet (7) located inside the heater. The ventilation channel (6) is located in the valve body (5) itself, and the valve body (5) can be axially displaced against a restoring force in relation to the holding body (4), with the inlet (7) being displaced out of the closed position inside the holding body (4) into the heater, after an axial displacement, and the valve body (5) and the holding body (4) can be adjusted in relation to each other in a rotational direction.

14 Claims, 2 Drawing Sheets

FOREIGN PATENT DOCUMENTS

| | | | |
|---|---|---|---|
| DE | 2553196 A * | 6/1977 | |
| EP | 1128109 A1 * | 8/2001 | |
| FR | 1 488 411 | 7/1967 | |
| GB | 484766 | 5/1938 | |
| RU | 1 712 734 | 2/1992 | |

* cited by examiner

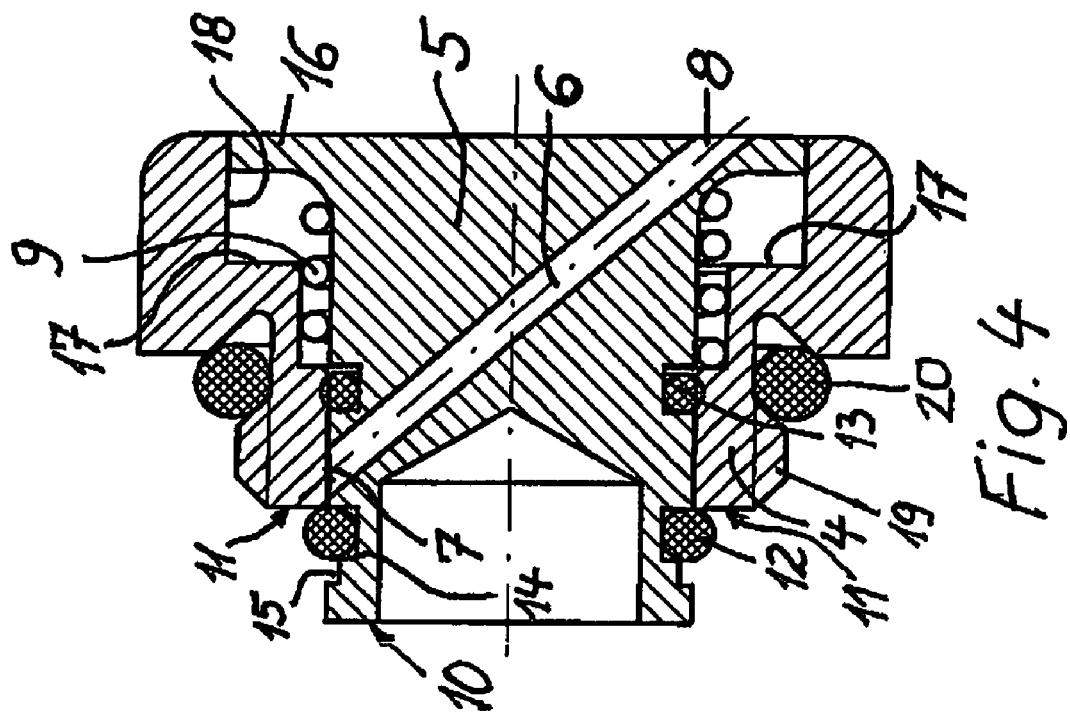
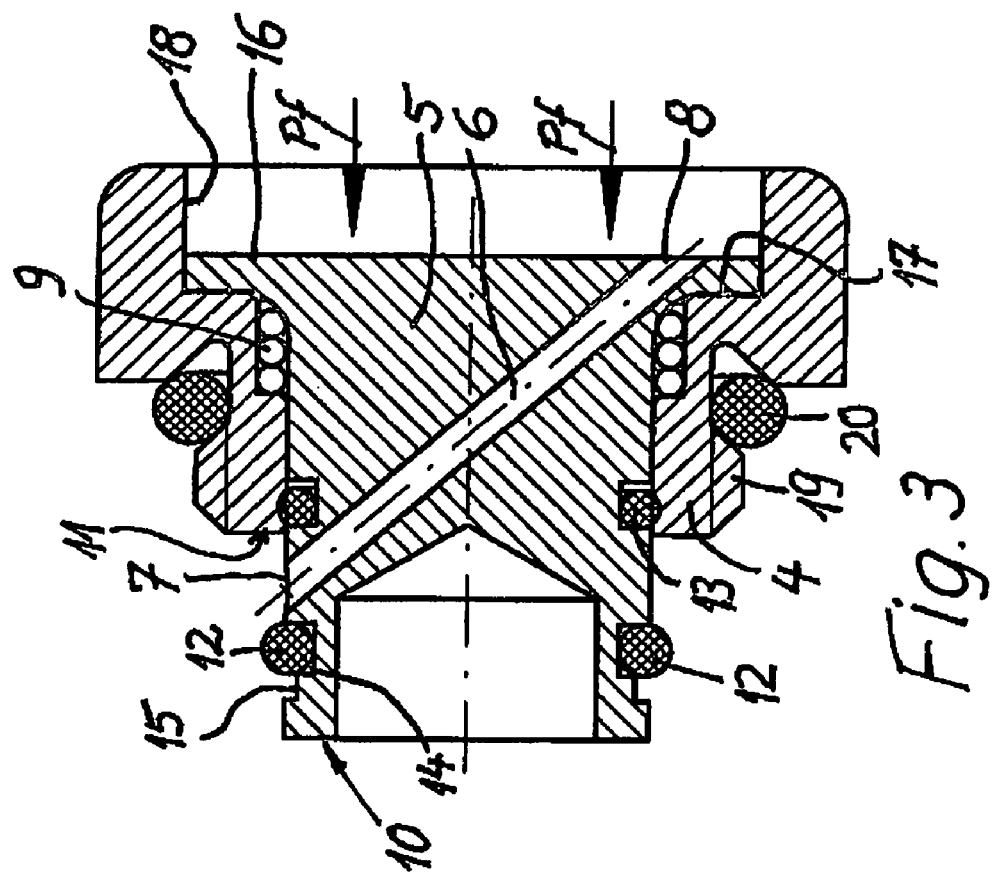

VENTILATION VALVE FOR HEATERS, COMPRISING A HOLDING BODY AND AN AXIALLY DISPLACEABLE VALVE BODY

BACKGROUND

The invention relates to a ventilation valve for heaters or heating installations, with the valve comprising a holding body that can be mounted in an opening or threaded opening of the heater or the heating installation and comprising a valve body, which can be axially displaced on the holding body, which closes a ventilation channel in the initial position, and which opens the same after being axially displaced, with the inclined and/or angled and/or optionally curved course of the ventilation channel deviating from an axial orientation and the ventilation channel comprising an inlet, which is located inside the heater in the position of use and which is arranged higher than its outer outlet.

A ventilation valve of this type is known from DE GM [German Utility Model] 1 774 267 and also from DE GM 67 51 165. In both cases, the ventilation channel is arranged in a heater and is closed or opened by a ventilation screw, which is formed as a valve body and which can be displaced axially by means of a thread.

Here, it is difficult to arrange this ventilation valve and primarily the holding body when the holding body is screwed in so that the inlet has the highest or highest possible position in the inclined or angled ventilation channel within the heater, in order to be able to let off as much air as possible in the venting process. Furthermore, a separate ventilation screw is to be provided and must be activated properly for ventilation, wherein, as a rule, a special tool is also required.

Therefore, the objective arises of providing a ventilation valve of the above-noted type, which simplifies the arrangement of the ventilation channel in the desired position.

SUMMARY

To address this objective, the ventilation channel is arranged at least partially or completely in the valve body itself, the valve body is adjustable or displaceable relative to the holding body axially against a restoring force, the upper inlet into the ventilation channel is moved in the closed position within the holding body and after axial displacement it is moved out of this holding body into the interior of the heater or the heating installation, and the valve body and the holding body can be adjusted relative to each other in the rotational direction.

Thus, the valve body can be adjusted or rotated relative to the holding body inserted into the heater or the heating installation at a later time, so that the outlet obtains the lowest possible position and primarily the inlet obtains the highest possible position in the interior of the heater or the heating installation. For ventilation, it is then sufficient to move the valve body itself axially into the interior of the heating installation or the heater, so that the initially inaccessible inlet opening within the holding body is displaced into the ventilation channel in the interior, so that excess air can enter into the inlet and be discharged through the ventilation channel. After the venting process, it is sufficient to let the valve body move back into its closed position, which can be realized automatically by the restoring force.

It is particularly advantageous when the valve body can rotate for relative adjustment relative to the holding body. If the ventilation channel extends in a previously known way from a high inlet position to a lowest possible outlet position, it is sufficient to rotate the valve body with the outlet, which is visible from the outside, so that the inlet automatically is as high as possible. Thus, the outlet can serve as a marking and can be used during the adjustment of the valve body containing the ventilation channel.

The valve body can be displaced axially for the venting process and can be pressed into the holding body against the restoring force. Therefore, special tools for the venting process are unnecessary. The operation is very simple, because it is sufficient to press the valve body against the restoring force deeper into the holding body until the inlet into the ventilation channel on the valve body is brought directly into connection with the interior of the heater or heating installation, so that excess air can then be discharged. The venting process can also be stopped again by releasing the valve body in a simple way, because it is then moved back into its closed position by the restoring force.

For the generation of the restoring force, a restoring spring, especially a compression spring, preferably—for a valve body that is displaceable or movable axially in a straight line when it is activated—a coil spring, which can be tensioned when the valve body is pushed or pressed in, can be provided between the holding body and the valve body. This produces an extremely simple and economical construction.

The ventilation channel can be formed with a straight-line course running diagonally from the upper inlet to the lower outlet. This produces an especially simple and consequently effective formation of the ventilation channel, in which the outlet can be used simultaneously as a marking, because the lowest position of the outlet automatically means the highest position of the inlet. Thus, this embodiment is the most preferred solution to the previously mentioned problem.

To prevent undesired leakage, it is useful if the inlet into the ventilation channel is sealed relative to the holding body and thus relative to the interior of the heater or the heating installation in its resting or closed position.

Here, it is especially advantageous and useful if the inlet is arranged on the peripheral surface of the valve body adjacent to its front side. Thus, the inlet can be shielded by the holding body relative to the interior of the heater in the resting position of the holding body, which also simplifies a corresponding additional seal.

For example, for—additional—sealing of the inlet into the ventilation channel on the annular or front surface of the holding body facing the interior of the heater between the holding body and the adjacent peripheral surface of the valve body and here between the inlet and the front side of the valve body directed towards the interior of the heater or the heating installation, a peripheral sealing ring can be provided. This produces a very effective seal between the interior of the heater or the heating installation and the inlet. Consequently, an axial adjustment of the valve body—together with the sealing ring—into the interior of the heater produces free accessibility to the inlet in the ventilation position.

On the side of the inlet into the ventilation channel facing the outer side of the heater or the heating installation, another sealing ring surrounding the valve body can be provided. This improves the seal and also prevents discharge of heating fluid between the holding body and the valve body during the venting process, because this second sealing ring remains in the interior of the holding body in the venting process.

The sealing ring/s can be arranged in an annular groove on the holding body and/or on the valve body. Especially favorable is an arrangement in annular grooves of the valve body, because the assembly and also, if necessary, replacement of one or both sealing rings is also simplified.

The sealing ring, which is especially important for the seal and which is arranged on the front side of the holding body, is effectively arranged in an annular groove of the valve body and held by a safety or snap ring arranged on the side facing away from the holding body, wherein this safety or snap ring is simultaneously used at least indirectly via the sealing ring as an axial stop of the valve body on the inner end of the holding body and/or as an axial support for the sealing ring. The safety or snap ring thus has a double function, because on one hand it prevents the valve body from being able to be displaced too far back or even removed axially from the holding body, and because it simultaneously also fixes the sealing ring on the front side of the holding body relative to the valve body and thus tensions the sealing ring.

It should be mentioned that it can be useful if the sealing ring or rings are O-rings, which are available economically in nearly any size.

The outer dimension or the cross section of the valve body can be equal to or smaller than the inner cross section of the receiving opening of the holding body over its entire length engaging in the holding body and the snap ring can be inserted or pushed in together with the valve body after pushing in the valve body into the region then covering the holding body and can then spring into the holding and stop position by its spring force after emerging from the holding body. However, especially favorable is a snap ring, which is inserted after the valve body is pushed in and is held within the corresponding annular groove by its spring force.

The outer front side of the valve body can be enlarged relative to the inner opening of the holding body as an activation or pressure surface and can have a distance corresponding to the adjusting or displacing path of the valve body in its open position from a counter stop of the holding body in the closed position of the ventilation valve. This simplifies operation, because the user has available a sufficiently large pressure surface, whose enlargement relative to the other cross section of the valve body can simultaneously also be used as a stop for limiting the largest possible displacement.

Here, the outer front side of the valve body can be arranged countersunk in an expanded opening of the holding body completely or partially and especially guided with its peripheral edge in this expanded opening of the holding body. Therefore, the guidance of the valve body is improved in its axial displacement and possible tilting can be prevented. In addition, this enlarged outer surface permits the outlet of the ventilation channel to open at a position, which is deeper than the lower meridian line of the actual valve body.

BRIEF DESCRIPTION OF THE DRAWINGS

An embodiment of the invention is described in more detail below with reference to the drawing. Shown in partial schematic representation are:

FIG. 3 is a view at a further enlarged scale, of the ventilation valve in the open position, in which the valve body is pressed relative to the holding body in the axial direction, whereby a restoring spring is tensioned, and FIG. 4 is a view corresponding to FIG. 3 after letting off the pressure, with which the valve body was set in the open position, whereby it is pushed back into the closed position by the restoring spring.

DETAILED DESCRIPTION OF THE PREFERRED EMBODIMENTS

Figure 1:
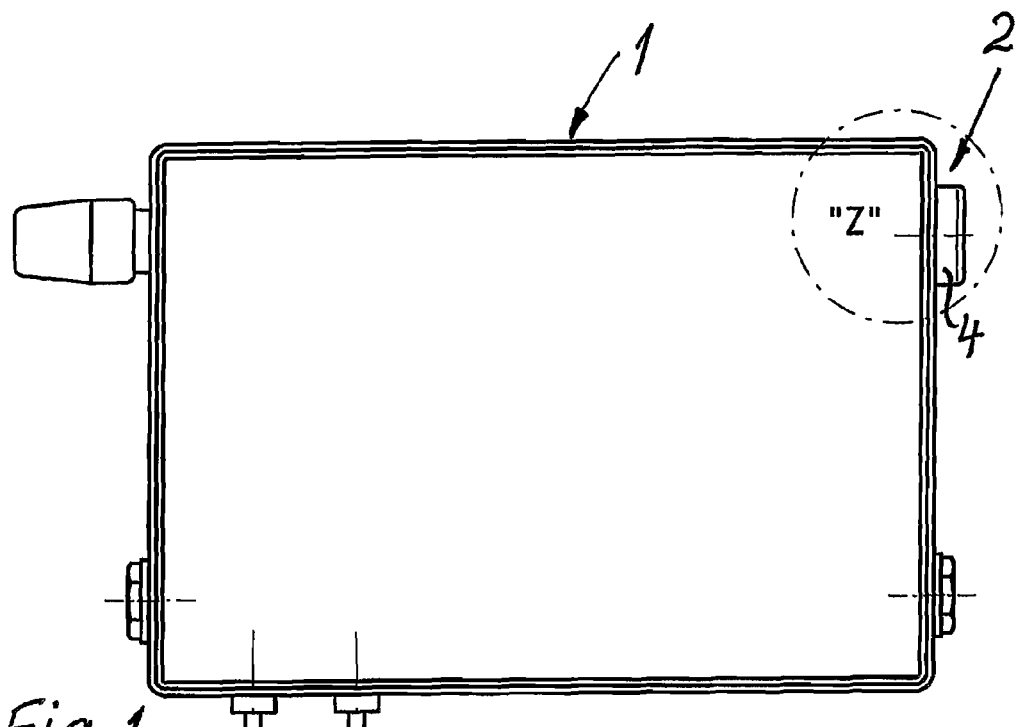
FIG. 1 is a view of a heater with an emphasized detail "Z" as the marking of the arrangement of a ventilation valve according to the invention.
Figure 2:
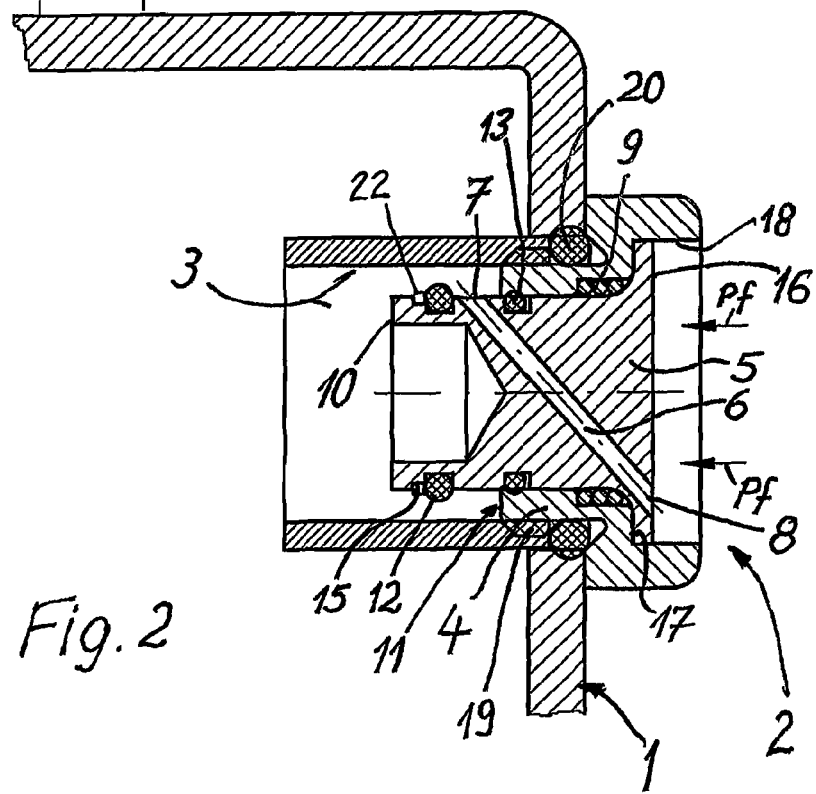
FIG. 2 is, at an enlarged scale, the detail "Z" in longitudinal section with the ventilation valve, in which a valve body is adjustable in the axial direction arranged in a holding body screwed into the heater and is moved into the open position.

A ventilation valve, which is designated as a whole with 2 is provided on a heater 1 and includes a holding body 4 that can be mounted according to FIG. 2 in a threaded opening 3 of the heater 1. The ventilation valve has a valve body 5 that can be adjusted axially relative to the holding body 4 and that closes a ventilation passage or ventilation channel 6 in the original position according to FIG. 4 and that opens this channel for a venting process after axial adjustment according to FIGS. 2 and 3. The ventilation channel 6 has a diagonal course deviating from an axial orientation and has in the interior of the heater 1—or optionally a heating installation— in the position of use an inlet 7, which is arranged higher than its outer outlet 8. In this embodiment, the inlet 7 is provided at the highest possible position in order to enable correspondingly effective venting of the heater 1.

It can be seen in the figures that this ventilation channel 6 is not arranged in the holding body 4, but instead is located in the valve body 5 itself, and the valve body 5 is adjustable and displaceable relative to the holding body 4 axially against a restoring force that is explained in further detail below. This becomes clear primarily through the comparison of FIGS. 3 and 4.

It can be further seen in FIG. 4 that the upper inlet 7 into the ventilation channel 6 is within the holding body 4 in the closed position and therefore is inaccessible, and after the axial adjustment it is moved from this position into the interior of the heater 1, so that excess air can then be led from the heater 1 through the ventilation channel 6 and its inlet 7 to the outlet 8 and thus into the surrounding environment.

The valve body 5 and the holding body 4 can be adjusted relative to each other in the rotational direction, so that the diagonal arrangement of the ventilation channel 6 can be located as effectively as possible, so that the inlet 7 is as high as possible, as shown in FIGS. 2 to 4.

Due to the round, circular cross sections of the valve body 5 and the inner opening of the holding body 4 receiving the valve body, the valve body 5 can rotate for relative adjustment relative to the holding body 4, so that the user only has to rotate the outlet 8 into a lower position in order to be certain that the inlet 7 is as high as possible in the interior.

By comparing FIGS. 3 and 4, it becomes clear that the valve body 5 is displaceable for the venting process for axial adjustment and can be pressed against the already mentioned restoring force into the holding body 4 and thus the heater 1. This pressing force is depicted schematically in FIGS. 2 and 3 by the two arrows PF.

For generating the already mentioned restoring force between the holding body 4 and the valve body 5, in this embodiment a restoring spring 9 is provided in the form of a compression spring, which here is formed as a coil spring and is tensioned when pushing or forcing in the valve body 5.

For a simple production and simultaneously effective ventilation, the ventilation channel 6 is formed with a straight-line course running diagonally from the upper inlet 7 to the outlet 8 through the middle of the valve body 5, as can also be seen well in FIGS. 2 to 4. The inlet opening 7 into the ventilation channel 6 is here sealed in its resting or closed position according to FIG. 4 relative to the holding body 4 and thus relative to the interior of the heater 1 or a heating installation, so that undesired discharge of any medium from the heater 1 or a heating installation is prevented.

Here, in an especially favorable way, the inlet 8 is arranged on the peripheral surface of the valve body adjacent to its front side 10, at a position of the peripheral surface of the valve body 5, which comes to lie in the closed position in the interior of the holding body 4, so that the inlet 8 is covered and sealed in the closed position by the inner wall of the holding body 4.

So that production of the parts is also possible with large tolerances and nevertheless there is sufficient sealing, a peripheral sealing ring 12 is also provided for sealing the inlet opening 8 into the ventilation channel 6 on the annular or front surface 11 of the holding body 4 facing the interior of the heater 1 between this holding body and the adjacent peripheral surface of the valve body 5 and here between the inlet 8 and the front side 10 of the valve body 5 directed towards the interior of the heater 1 or the heating installation. One can recognize this arrangement especially well in FIG. 4. This sealing ring 12, which is effectively an O-ring, thus seals the front seam between the valve body 5 and the holding body 4 in the closed position of the ventilation valve 1, so that access to the ventilation channel 6 located in the interior of the holding body 4 and its inlet 8 is prevented, and when the ventilation valve 1 is opened moves together with the valve body 5 into the interior of the heater 1.

So that no hot water can emerge from the ventilation valve between the holding body 4 and valve body 5 during the venting process according to FIGS. 2 and 3, another sealing ring 13 surrounding the valve body 5 is also provided on the side of the inlet 8 into the ventilation channel 6 facing the outer side of the heater 1. This sealing ring also remains during the venting process according to FIG. 3 in the interior of the holding body 4—at least partially or according to FIG. 3 completely.

Here, one can see in the embodiment that the sealing rings 12 and 13 are each arranged in an annular groove on the valve body 5, thus, they are displaced with this valve body. However, it would also be conceivable that the sealing ring 13, for example, is arranged to a certain extent stationary in an annular groove arranged in the interior of the holding body 4.

Above all, the sealing ring 12 arranged near the front side 10 of the valve body and on the front side 11 of the holding body 4 in the closed position is arranged in an annular groove 14 of the valve body 5 and can be held and supported on the side facing away from the holding body 4 by a safety ring or snap ring 22, shown in FIG. 2, but not shown for reasons of better overview in FIGS. 3 and 4. One can see on the valve body 5 in the embodiment adjacent to the sealing ring 12 another annular groove 15 with a larger inner radius relative to the annular groove 14, wherein such a snap ring 22 should and can be used. Such a snap ring 22 can be used simultaneously at least indirectly via the sealing ring 12 as an axial stop of the valve body 5 on the inner end 11 of the holding body 4 and also as an axial support for the sealing ring 12.

The outer dimension or the cross section of the valve body 5 is equal to or smaller than the inner cross section of the already mentioned receiving opening of the holding body 4 over its entire length engaging in the holding body 4, also in the region of the front side 10 adjacent to the annular groove 15 and the annular groove 14. Thus the valve body 5 can be pushed into the holding body 4 in the axial direction, after which the snap ring can then be inserted into the groove 15, which is located in a region of the valve body 5 that projects past the front side 11 of the holding body both in the closed position and also in the open position of the ventilation valve 1. Then, the ventilation valve can be inserted, especially screwed, into the opening 3.

The outer front side 16 of the valve body 5 is enlarged relative to the inner opening of the holding body 4 as an activation or pressure surface, which primarily also simplifies the handling. In addition, it can also be used as a stop for limiting the displacement path of the valve body 4 during the opening process.

By comparing FIGS. 3 and 4 it becomes clear that this enlarged front side 16 in the closed position of the ventilation valve 1 has a distance corresponding to the adjustment or displacement path of the valve body 5 into its open position from a counter stop 17 provided on the holding body 4.

Thus, when venting, the user needs to press the valve body 5 past its front side 16 only until it goes no farther, because then this activation or pressure surface comes into contact with its enlarged cross section on the counter stop 17. Therefore, the inlet 7 is then moved sufficiently far out from the interior of the holding body 4, in order to be able to discharge excess air located in the heater 1.

The outer front side 16 of the valve body 5 is here arranged countersunk in an expanded opening 18 of the holding body and also guided into this expanded opening 18 of the holding body with its peripheral edge, so that tilting is also prevented during activation to the greatest extent.

Through the enlarged periphery and diameter of this front side 16, the outlet 8 of the ventilation channel 6 can open at a position, which is deeper than the lower meridian line of the valve body 5. The diagonal ventilation channel 6 can thus be arranged steep accordingly, in order to hold the axial length of the valve body 5 within limits. Because the valve body 5 can be rotated relative to the holding body 4, the holding body 4 can be screwed into the corresponding opening 3 of the heater 1 with its threads 19 and in this way sealed by means of a seal 20, without having to take into account the course of the ventilation channel 6, because this can be set and rotated at a later time into the optimum position. This optimum position is produced by the diagonal course of the ventilation channel 6 from its inlet 7 to the outlet 8 through the middle of the valve body by itself, if the outlet 8 has the lowest possible position.

The invention claimed is:

1. Ventilation valve (2) for a heater (1) or heating installation, comprising a holding body (4) that can be mounted in an opening or threaded opening (3) of the heater (1) or the heating installation and a valve body (5), which is adjustable axially in the holding body (4), which closes a ventilation passage or ventilation channel (6) in a first position, and which opens the channel after axial displacement, wherein the ventilation channel (6) has one of a diagonal or angled or curved course deviating from an axial orientation and has an inlet (7), which is located in an interior of the heater (1) in a position of use and which is arranged higher than an outer outlet (8) thereof, wherein the ventilation channel (6) is arranged at least partially or completely in the valve body (5), the valve body (5) is adjustable or displaceable axially for opening the channel relative to the holding body (4) against a restoring force, via which the inlet (7) of the ventilation channel (6) is biased into the closed position within the holding body (4) and after axial displacement is moved out from the holding body to the interior of the heater (1) or the heating installation while a periphery of the valve body remains sealed against an inner periphery of the holding body, and the valve body (5) and the holding body (4) can be adjusted relative to each other in a rotational direction, and the valve body (5) is axially displaceable for venting by being axially pressed from the first, closed position into the holding body (4) against the restoring force to an open position, and upon release, the restoring force alone returns the valve body to the first, closed position.

2. Ventilation valve according to claim 1, wherein the valve body (5) can rotate relative to the holding body (4) for relative adjustment.

3. Ventilation valve according to claim 1, wherein for generation of the restoring force, a restoring spring is located between the holding body (4) and the valve body (5), which can be tensioned when pushing or pressing the valve body (5).

4. Ventilation valve according to claim 1, wherein the axial displacement is generally horizontal and the ventilation channel (6) has a straight-line course running diagonal from the upper inlet (7) to the outer outlet (8) which is positioned below the upper inlet.

5. Ventilation valve according to claim 1, wherein the inlet (7) into the ventilation channel (6) is sealed in a resting or closed position relative to the holding body (4) and thus relative to the interior of the heater (1) or the heating installation.

6. Ventilation valve according to claim 1, wherein the outlet (8) of the ventilation channel (6) opens or is arranged at a position, which is lower than a lower sealing surface of the valve body (5) and the inner opening of the holding body (4).

7. Ventilation valve according to claim 1, wherein an outer front side (16) of the valve body (5) is enlarged relative to an inner opening of the holding body (4) as an activation or pressure surface and in a closed position of the ventilation valve has a distance corresponding to an adjustment or displacement path of the valve body (5) in an open position from a counter stop (17) of the holding body.

8. Ventilation valve according to claim 7, wherein the outer front side (16) of the valve body (5) is arranged countersunk in an expanded opening (18) of the holding body and is guided especially with a peripheral edge thereof in the expanded opening (18) of the holding body.

9. Ventilation valve according to claim 1, wherein the inlet (7) is arranged on a peripheral surface of the valve body (5) adjacent to a front side (10) thereof, and lies in the closed position in an interior of the holding body (4).

10. Ventilation valve according to claim 9, wherein a peripheral sealing ring (12) for sealing the inlet (7) to the ventilation channel (6) is located on an annular surface or front surface (11) of the holding body (4) facing the interior of the heater (1), between the holding body and an adjacent peripheral surface of the valve body (5) and in this way provides a seal between the inlet (7) and the front side (10) of the valve body (5) directed towards the interior of the heater (1) or the heating installation.

11. Ventilation valve according to claim 10, wherein another peripheral sealing ring (13) is located on the valve body (5) in the ventilation channel (6) on a side of the inlet (7) facing an outer side of the heater (1) or the heating installation.

12. Ventilation valve according to claim 11, wherein the sealing ring or rings (12, 13) is/are arranged in an annular groove on the holding body (4) and/or on the valve body (5).

13. Ventilation valve according to claim 10, wherein the sealing ring (12) arranged on the front side (10) of the holding body (4) is arranged in an annular groove (14) of the valve body (5) and is held by a safety ring or snap ring arranged on a side facing away from the holding body (4), wherein the safety ring or snap ring is used simultaneously at least above the sealing ring (12) as an axial stop of the valve body (5) on an inner end (11) of the holding body (4) and/or as an axial support for the sealing ring (12).

14. Ventilation valve according to claim 13, wherein an outer dimension or cross section of the valve body (5) is equal to or smaller than an inner cross section of a receiving opening of the holding body (4) over an entire length thereof engaging in the holding body (4) and the snap ring can be inserted into a region then projecting over the holding body after insertion of the valve body or can be pushed in together with the valve body and after emerging from the holding body spring into a holding and stop position by a spring force thereof.

* * * * *